United States Patent [19]

Millray

[11] 4,062,288

[45] Dec. 13, 1977

[54] INITIATOR FOR TIRE INFLATOR

[75] Inventor: Robert Millray, Saugus, Calif.

[73] Assignee: Allied Chemical Corporation, Morris Township, N.J.

[21] Appl. No.: 758,377

[22] Filed: Jan. 10, 1977

Related U.S. Application Data

[63] Continuation of Ser. No. 554,898, March 3, 1975, abandoned.

[51] Int. Cl.² .................... F42B 3/04; B65B 31/00; B60C 23/10; B67B 7/24
[52] U.S. Cl. ...................... 102/39; 141/38; 152/415; 222/3
[58] Field of Search ............ 102/39 R; 137/231; 141/38; 222/3; 152/415

[56] References Cited

U.S. PATENT DOCUMENTS

| | | | |
|---|---|---|---|
| 1,008,646 | 11/1911 | Kassner | 141/38 |
| 2,498,596 | 2/1950 | Wallach | 141/38 |
| 3,269,310 | 8/1966 | Wismar | 102/39 |
| 3,774,807 | 11/1973 | Keathley | 222/3 |
| 3,901,747 | 8/1975 | Garner | 149/42 |
| 3,912,562 | 10/1975 | Garner | 149/41 |

Primary Examiner—Stephen C. Bentley
Assistant Examiner—Donald P. Walsh
Attorney, Agent, or Firm—Ernest D. Buff

[57] ABSTRACT

The invention is a light, portable, miniaturized tire inflator adapted to fit in a limited space, such as in a tire well for a deflated, space-saving tire in a trunk of an automobile, and adapted to be carried or held in one hand. The tire inflator includes: a pyrotechnic material, an ignitor mechanism, a pressure vessel, and a nozzle. The pyrotechnic material generates an inflating gas upon burning to inflate a tire without a source of stored fluid. The ignitor mechanism is located adjacent to the pyrotechnic material to ignite and cause the pyrotechnic material to burn. The pressure vessel holds the pyrotechnic material. The pressure vessel has a tire end and a pyrotechnic end. The nozzle is mounted on the tire end of the pressure vessel. The nozzle is adapted to be connected directly to a valve of the tire. The nozzle includes a combined connection for the tire valve and initator for convening the chain reaction which will automatically result in the inflation of the tire on connection of the inflator to the tire.

2 Claims, 9 Drawing Figures

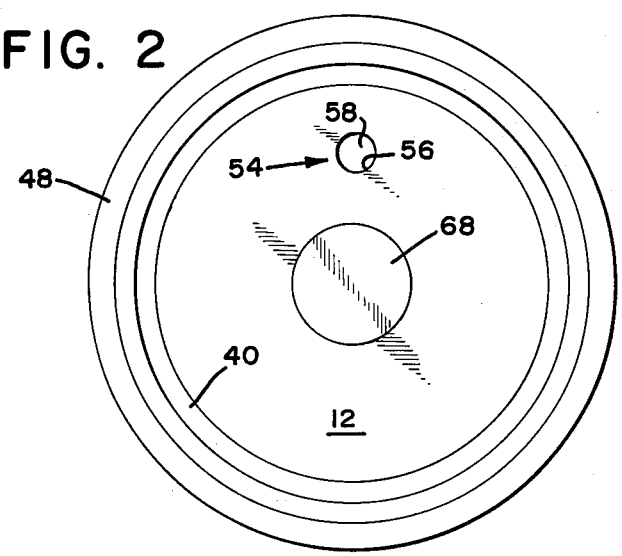
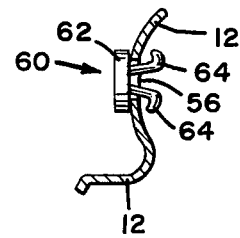
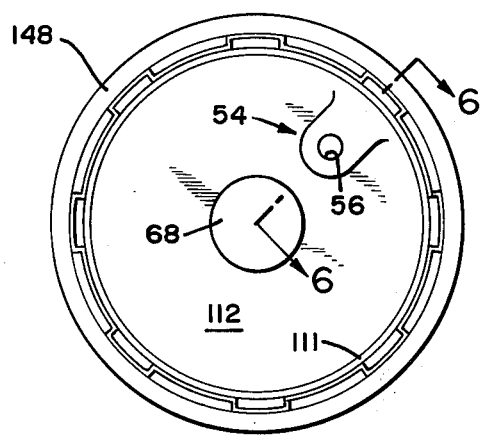
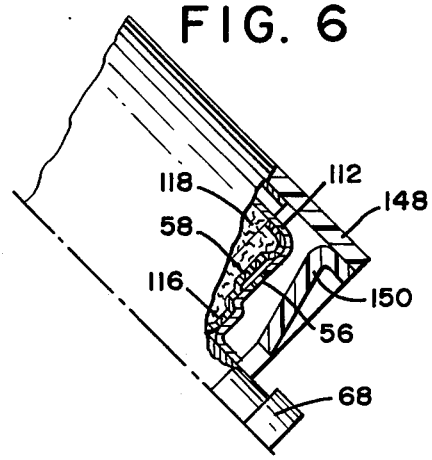
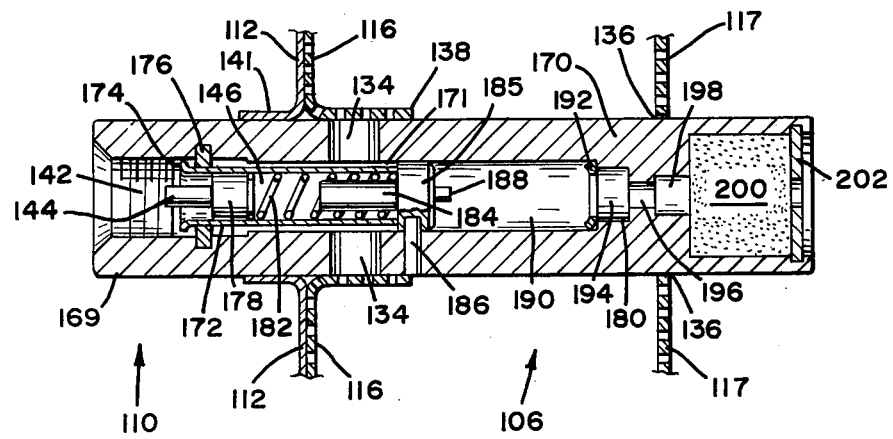

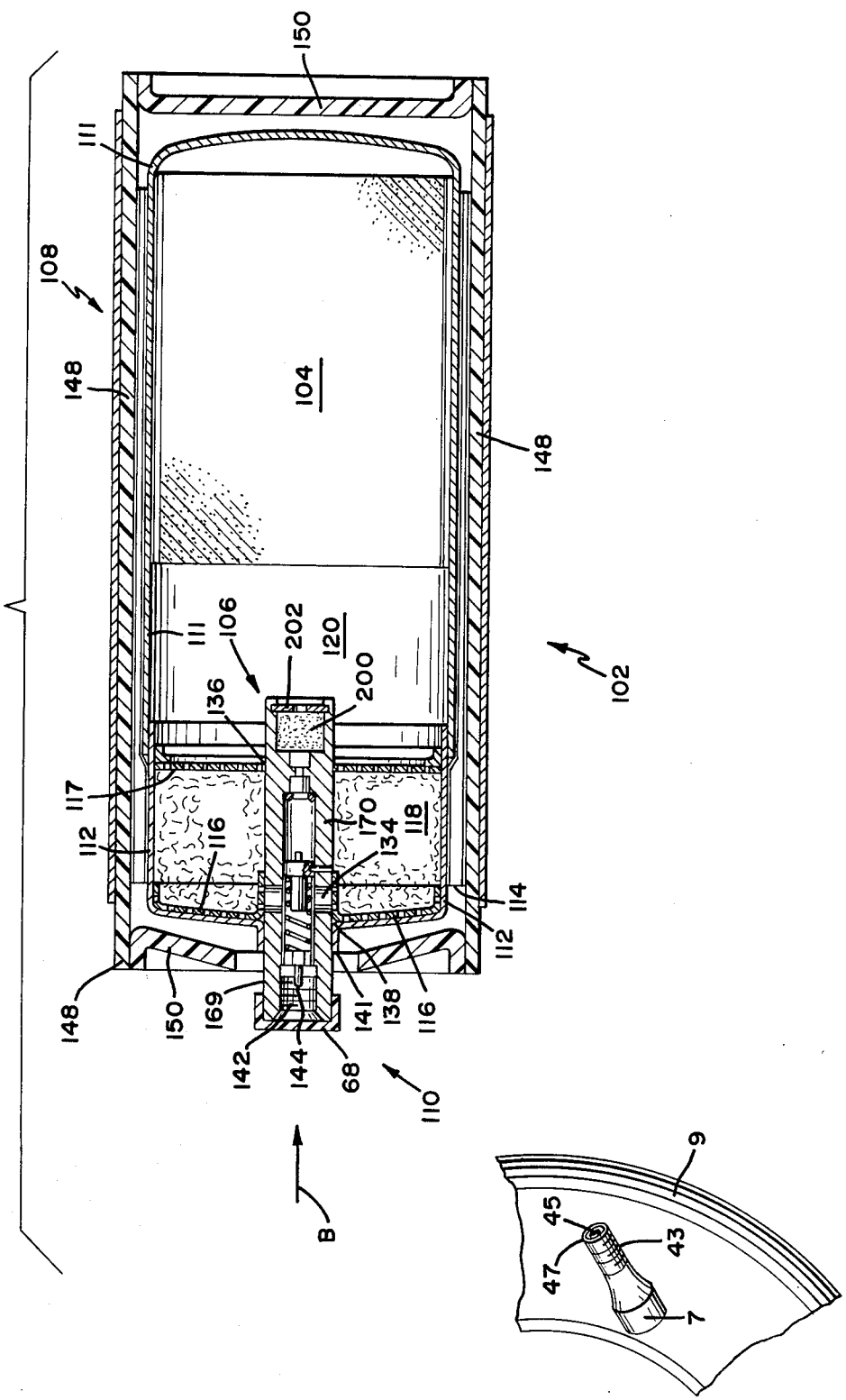

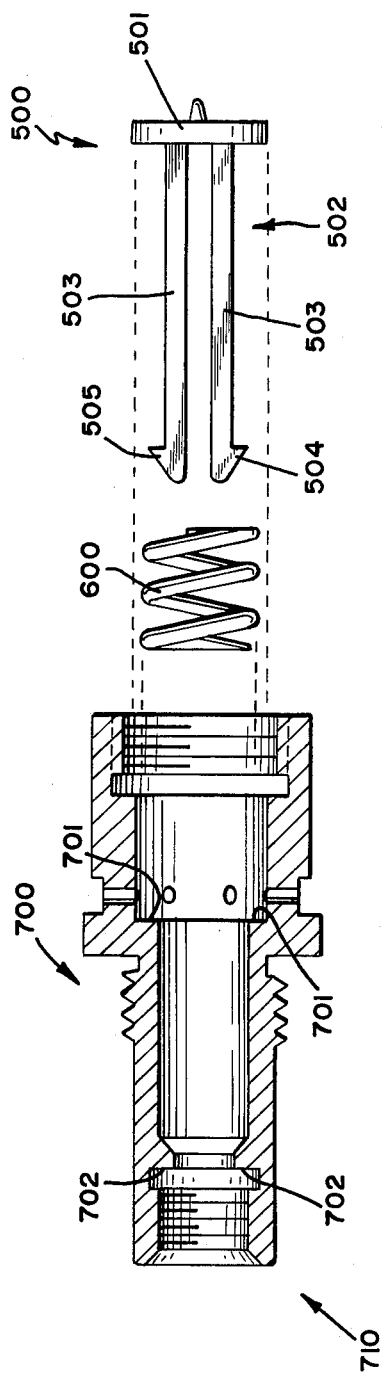
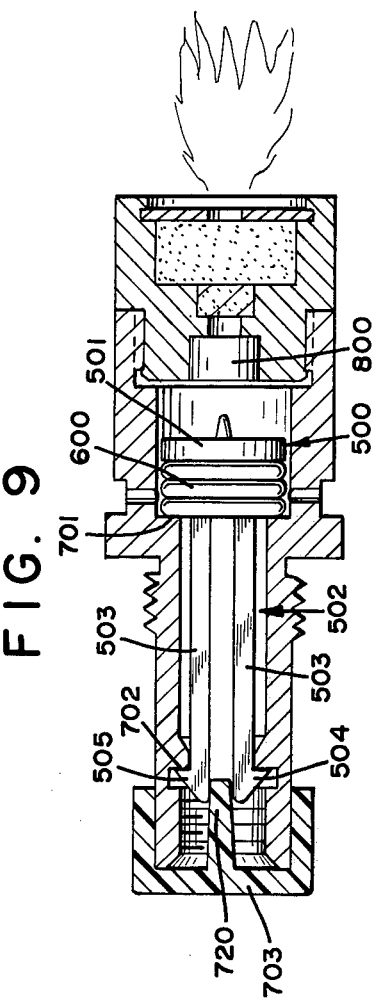

INITIATOR FOR TIRE INFLATOR

This is a continuation of application Ser. No. 554,898, filed Mar. 3, 1975, now abandoned.

BACKGROUND OF THE INVENTION

The invention relates to miniaturized apparatus for inflating a pneumatic tire, such as a tire used on an automobile, truck, bicycle or other vehicle. The apparatus is small enough to fit in a limited space, such as in a tire well for a deflated, space-saving tire in a trunk of an automobile or in a glove compartment of an automobile. The apparatus is light in weight, portable and can be carried or held in one hand by the user. The apparatus is adapted to be attached directly to a valve of a tire to inflate the tire. The inflating gas is derived solely from burning a pyrotechnic material, preferably a slow burning, compacted pyrotechnic material. The apparatus does not use a stored fluid of any type, neither a compressed nor a liquefied gas.

U.S. Pat. No. 1,008,646 to Kassner, issued in 1911, discloses an apparatus for inflating a tire which is transportable, but not miniaturized and which uses celluloid to generate a gas upon burning. The device of the Kassner patent is not attached directly to the tire valve. Modern tire inflation apparatus have heretofore depended upon a stored fluid, either compressed gas or liquefied gas, rather than a gas generated by burning a pyrotechnic material, as illustrated in U.S. Pat. Nos. 3,448,779 and 3,513,885 to Horwitt; U.S. Pat. No. 2,498,596 to Wallace; and U.S. Pat. No. 2,218,931 to Carlson. The use of a comparatively faster-burning pyrotechnic material to inflate a vehicle safety bag, without the use of a stored gas, is disclosed in U.S. Pat. Nos. 3,618,980 and 3,618,981 to Leising; and in U.S. Pat. application Ser. No. 316,947, filed Dec. 20, 1972 which is a continuation of U.S. patent application Ser. No. 110,845, filed Jan. 29, 1971, both entitled "Gas Generator," both filed in the name of John J. Sack and Thomas E. Lohr, and both having a common assignee with the present invention.

SUMMARY OF THE INVENTION

The invention is a light, portable, miniaturized tire inflator adapted to fit in a limited space, such as in a tire well for a space-saving tire in a trunk of an automobile, and adapted to be carried or held in one hand. The tire inflator includes: a pyrotechnic material, an ignitor mechanism, a pressure vessel, and a nozzle. The pyrotechnic material generates an inflating gas upon ignition and burning to inflate a tire without a source of stored fluid. The ignitor mechanism is located adjacent to the pyrotechnic material to ignite and cause the pyrotechnic material to burn. The pressure vessel holds the pyrotechnic material. The pressure vessel has a tire and a pyrotechnic end. The nozzle is mounted on the tire end of the pressure vessel. The nozzle is adapted to be connected directly to a valve of the tire and includes the initiator for causing burning of the pyrotechnic material to supply gas for inflation.

DESCRIPTION OF THE DRAWINGS

FIGS. 1 to 7 are prior art to this invention and the drawings and designation relating thereto are found in application Ser. No. 520,506 filed Nov. 4, 1974 and assigned to the assignee of this application.

FIG. 1 is a cross-sectional view of a first embodiment of the tire inflator apparatus and a portion of a tire, including a tire valve, to be inflated by the tire inflator apparatus.

FIG. 2 is an end view of FIG. 1 in the direction of arrow A in FIG. 1.

FIG. 3 is a cross-sectional view of a portion of FIG. 1 showing an optional over-pressure relief valve, not shown in FIG. 1.

FIG. 4 is a cross-sectional view of a second embodiment of the tire inflator apparatus of this invention and a portion of a tire, including a tire valve, to be inflated by the tire inflator apparatus.

FIG. 5 is an end view of FIG. 4 in the direction of arrow B in FIG. 4.

FIG. 6 is a partial cross-sectional view of FIG. 5 along the lines 6—6 in FIG. 5.

FIG. 7 is an enlarged view of a portion of FIG. 4, showing a nozzle and the ignitor mechanism.

FIGS. 8 and 9 show the nozzle and ignitor mechanism of the invention.

DETAILED DESCRIPTION

Figure 1:
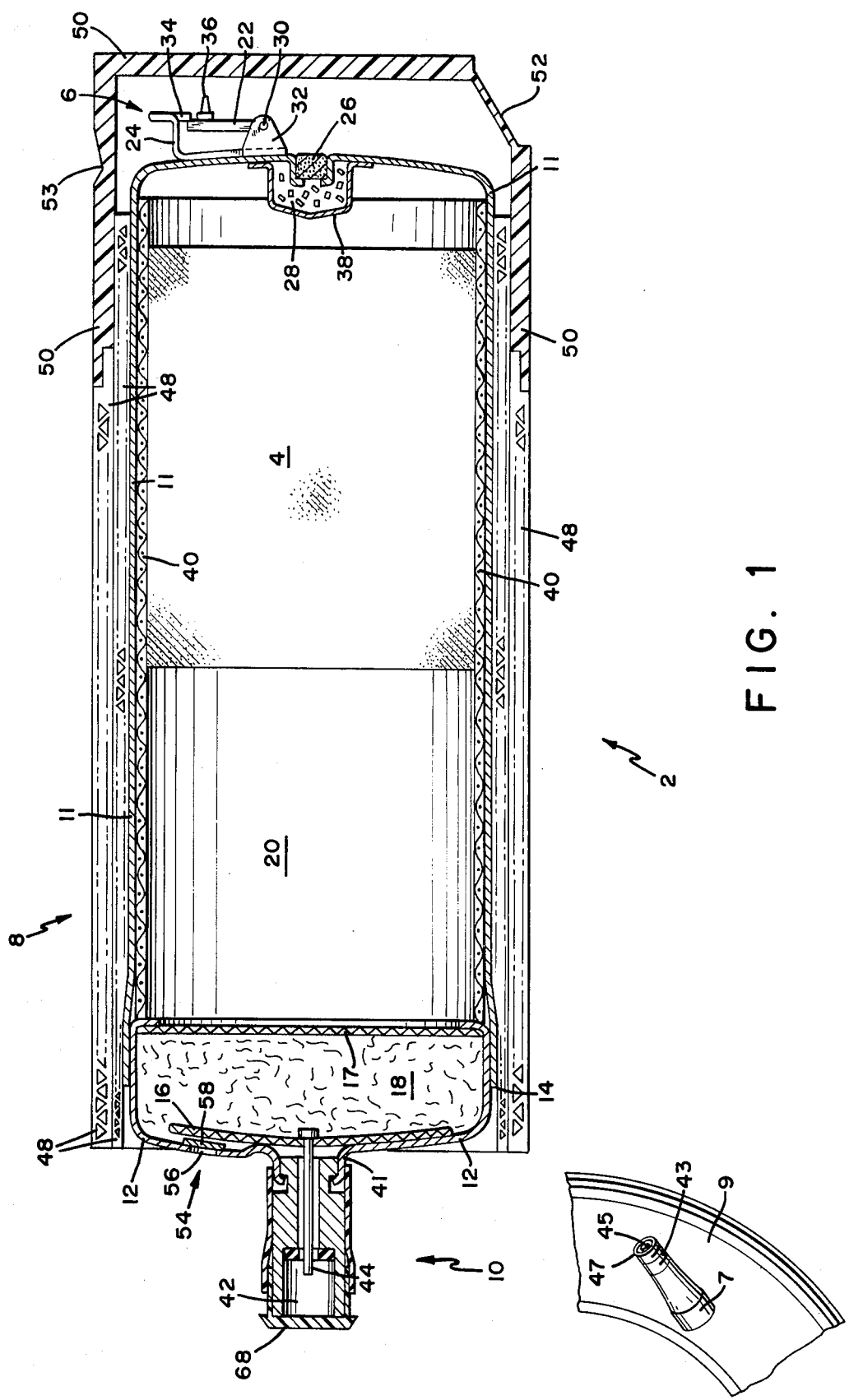

Referring to FIGS. 1-3, the embodiment is a light portable, miniaturized tire inflator, the first embodiment of which is referred to generally by the numeral 2. The first embodiment 2 of the tire inflator includes: a pyrotechnic material 4, an ignitor mechanism, referred to generally by the numeral 6; a pressure vessel, referred to generally by the numeral 8; and a nozzle, referred to generally by the numeral 10. The pyrotechnic material 4 generates substantially non-toxic and non-condensible inflating gas upon ignition and burning to inflate a tire, without a source of stored fluid, either compressed gas or liquefied gas. The ignitor mechanism 6 is located adjacent to the pyrotechnic material 4 to ignite and cause the pyrotechnic material 4 to burn. The pressure vessel 8 holds the pyrotechnic material 4. The pressure vessel 8 has an pyrotechnic end, at which the ignitor mechanism 6 is located and a tire end at the opposite end of the pressure vessel 8 from the pyrotechnic mechanism 6. The nozzle 10 is mounted on the tire end of the pressure vessel 8, at the opposite end of the pressure vessel 8 from the ignitor mechanism 6. The nozzle 10 is adapted to be connected directly to an inlet valve 7 of a tire 9 to inflate the tire 9. The term "directly" means that the nozzle 10 may be connected to a tire valve 7 without any need for a hose or tube between the nozzle 10 and the tire valve 7 without any need for a hose or tube between the nozzle 10 and the tire valve 7. For example, the nozzle 10 may be screwed on the tire valve 7.

The pressure vessel 8 includes a cannister 11 and a cannister cap 12. The cannister 11 has a cylindrical shape, a pyrotechnic end and a tire end. The tire end of the cannister 11 is open and has an outer edge 14. A portion of the cannister cap 12 is adapted to fit at, that is, either within or over the outer edge 14 of the tire end of the cannister 11. If the cannister 11 is arranged to fit over the outer edge 14, the outer edge 14 of the tire end of the cannister 11 may optionally be slightly larger in circumference as compared to the remainder of the cannister 11. The cannister cap 12 includes a first plate 16 and an optional coolant bed 18. The coolant bed 18 is made up of chips of steel or sand or similar material adapted to cool the inflating gas as the gas passes through the coolant bed 18. The first plate 16 has slots or other apertures through which the inflating gas passes to the nozzle 10. The cannister cap 12 also includes an optional second plate 17 which also has slots or other apertures. The coolant bed 18 is disposed between the first plate 16 and the second plate 17. Both the first plate 16 and the second plate 17 are arranged with their approximately planar surfaces substantially perpendicular to a longitudinal axis of the pressure vessel 8. The plates 16 and 17 may also be wire mesh screens.

The cannister 11 houses the pyrotechnic material 4. Preferably, the pyrotechnic material 4 occupies approximately half or slightly more than half of the total volume of the cannister 11. Preferably, the pyrotechnic material 4 is made up of grains which are compacted, that is, pressed together in the shape of a cylinder. The cannister 11 also has a plenum chamber 20 which includes the volume of the cannister 11 between the cannister cap 12 and the pyrotechnic material 4. The plenum chamber 20 is located between the second plate 17 and the pyrotechnic material 4. The plenum chamber 20 accommodates expansion of the gas generated by the pyrotechnic material 4. Preferably, the outer surface of the pyrotechnic material 4 between the pyrotechnic material 4 and the walls of the cannister 11 and between the end of the pyrotechnic material 4 adjacent to the plenum chamber 20 and the plenum 20 has a coating of a chemically inert inhibitor, such as a ceramic material. This coating keeps such outer surfaces of the pyrotechnic material 4 from igniting or at least delays ignition on such outer surfaces of the pyrotechnic material 4 from igniting or at least delays ignition on such outer surfaces of the pyrotechnic material 4. For example, the inhibitor may be Sauereisen #30 or Sauereisen #63 made by Sauereisen Company of Pittsburgh, Pa. The inhibitor is not used on the end of the pyrotechnic material 4 adjacent to ignitor mechanism 6, but only on the end of the pyrotechnic material 4 further away from ignitor mechanism 6.

The ignitor mechanism 6 is adapted to ignite the pyrotechnic material 4 and cause the pyrotechnic material 4 to burn. In the first embodiment 2 of the tire inflator, the ignitor mechanism 6 is located at the opposite end of the cannister 11 from the cannister cap 12 and the nozzle 10. The ignitor mechanism 6 includes: a striker 22, a biasing means (not shown) for the striker 22, a retaining member 24, a primer 26, and an ignition mix 28. The striker 22 has a pivot point 30 at one end, an actuated position, and a non-actuated position. The biasing means may be a coil spring located at the pivot point 30 of the striker 22, biasing the striker 22 in a pivoting direction to pivot clockwise on the pivot point 30 from the non-actuated position of the striker 22 to the actuated position of the striker 22.

In FIG. 1, the striker 22 is shown in its non-actuated position. The retaining member 24 is adapted to retain the striker 22 in its non-actuated position. The retaining member 24 has a pivot support 32 at one end to support the pivot point 30 of the striker 22 and the biasing means 24 for the striker 22, and a catch 34 at the opposite end of the retaining member 24 to retain the striker 22 in its non-actuated position as shown in FIG. 1. The catch 34 is adapted to be pressed in a direction toward the pressure vessel 8. The catch end of the retaining member 24 adjacent to the catch 34 is resilient enough to bend and to allow the catch 34 to release the striker 22. The striker 22 has a firing head 36, which may have a conical shape. The primer 26 is a percussion actuated primer adapted to be actuated by the striker 22 to provide a thermal signal which initiates combustion of the ignition mix 28. The primer 26 is sensitive to shock resulting from the impact of the firing head 36.

When the catch end of the retaining member 34 is pressed down, i.e. toward the cannister 11, the striker 22 is released. The biasing means, such as a coil spring, spring loads the striker 22 and causes the striker 22 to pivot approximately 180 degrees upon its pivot point 30 to the actuated position of the striker 22. In its actuated position, the firing head 36 of the striker 22 hits the primer 26. The primer 26 initiates combustion of the ignition mix 28 disposed in an ignition cup 38, which generates hot gas and hot particles, which ignite the pyrotechnic material 4. Combustion of the pyrotechnic material 4 produces the inflating gas for the tire 9. The pyrotechnic material 4 is the sole source of inflating gas for the tire. There is no stored fluid, neither compressed gas nor liquified gas.

The pyrotechnic material 4 has an ignition end adjacent to the ignition mechanism 6 and a nozzle end adjacent to the cannister cap 12. The inflating gas is initially generated at the ignition end of the pyrotechnic material 4. A gas permeable structure, such as a corrugated, expanded or perforated metal structure, preferably a metal screen 40 is disposed around the outer circumference of the pyrotechnic material 4 between the pyrotechnic material 4 and the cannister 11 for the purpose of allowing gas generated at the ignition end of the pyrotechnic material 4 to pass between the outer circumference of the pyrotechnic material 4 and the cannister 11 as the gas moves toward the plenum chamber 20.

The nozzle 10 has a tire end and a pyrotechnic end. The pyrotechnic end of the nozzle 10 is connected to a mouth 41 of the cannister cap 12. The tire end of the nozzle 10 has means, such as screw threads, to attach the nozzle 10 directly to means on the tire valve 7, such as screw threads 43 on the outer circumference of tire valve 7. The tire end of the nozzle 10 has a well 42. The tire end of the nozzle 10 is adapted to fit over and around the outer circumference of tire valve 7. The well 42 is dimensioned so that the tire valve 7 fits into the well 42. The screw threads or other attachment means are located in the well 42 on the inside walls of the nozzle 10. The nozzle 10 also includes an optional stem depressor 44 for depressing the valve stem 45 of the tire valve 7 to allow inflating gas to pass through the tire valve 7 into the tire 9. The stem depressor 44 is a stationary pin which extends through a nozzle bore 46 in the pyrotechnic end of the nozzle 10. The nozzle bore 46 extends from the pyrotechnic end of the nozzle 10 to the well 42 of the nozzle 10. The nozzle bore 46 conducts inflating gas from the pressure vessel 8 around the stem depressor 44 to the well 42. The stem depressor 44 is fixedly attached to the slotted plate 14.

An insulator 48 is provided around the outer circumference of the pressure vessel 8. The insulator 48 is cylindrical in shape and extends from the cannister cap 12 along approximately 80% of the length of the cannister 11. The insulator 48 may include one or preferably two layers of an insulating material, such as corrugated paper, plastic, or metal.

A safety cap 50 is disposed over the ignitor mechanism 6 and around the ignitor end of the cannister 11. Preferably, safety cap 50 is attached to or in abutting contact with the insulator 48. The outside end of the safety cap 50 opposite from the insulator 48 has a membrane 52 around a major part of the circumference of the safety cap 50. The membrane 52 is adapted to be ruptured by the user, such as by use of his thumb. The safety cap 50 also has an indented portion 53 at the opposite side of the safety cap 50 from the membrane. The indented portion 53 functions as a hinge after the membrane 52 is ruptured, enabling safety cap 50 covering the ignitor mechanism 6 to be bent back upon the indented portion 53, providing access to the ignitor mechanism 6.

In operation, the user removes the safety cap 50, attaches the nozzle 10 to the tire valve 7 to depress the valve stem 45 and depresses the catch 34. This releases the striker 22 which hits the primer 26. This ignites the ignitor mix 28 which causes the pyrotechnic material 4 to burn. The inflating gas generated upon combustion passes through the metal screen 40, the plenum chamber 20, the coolant bed 18, the nozzle bore 46, the well 42, and the tire valve 7 and into the tire 9.

Referring to FIGS. 4–7, the second embodiment of the tire inflator of the prior art is referred to generally by the numeral 102. The second embodiment 102 includes: a pyrotechnic material 104, an ignitor mechanism, referred to generally by the numeral 106; a pressure vessel, referred to generally by the numeral 108; and a nozzle, referred to generally by the numeral 110. The pyrotechnic material 104 is similar to that used for the first embodiment 2, illustrated in FIGS. 1–3. The ignitor mechanism 106 is located adjacent to the pyrotechnic material 104 to ignite and cause the pyrotechnic material 104 to burn, although the ignitor mechanism of 106 is not as close to the pyrotechnic material 104 as the ignitor mechanism 6 in the first embodiment 2. The pressure vessel 108 holds the pyrotechnic material 104. The pressure vessel 108 has a pyrotechnic end and a tire end. In contrast to the first embodiment 2, the ignitor mechanism 106 of the second embodiment 102 is located at the tire end of the pressure vessel 108, at the opposite end of the pressure vessel 108 from the pyrotechnic end. The nozzle 110 is also mounted on the tire end of the pressure vessel 108. The nozzle 110 is adapted to be connected directly to an inlet valve 7 of the tire 9 to inflate the tire 9, in the same manner as the nozzle 10 of the first embodiment 2.

The pressure vessel 108 includes a cannister 111 and a cannister cap 112. The cannister 111 has a cylindrical shape, a pyrotechnic end and a tire end. The tire end of the cannister 111 is open and has an outer edge 114. A portion of the cannister cap 112 is adapted to fit at, that is, either within the outer edge 114 or over the outer edge 114 of the tire end of the cannister 111. The cannister cap 112 includes a first plate 116 and an optional coolant bed 118. The coolant bed 118 is made up of chips of steel or sand or similar material adapted to cool the inflating gas as the gas passes through the coolant bed 118. The first plate 116 has slots or other apertures through which the inflating gas passes to the nozzle 110. The cannister cap 112 also includes an optional second plate 117 which also has slots or other apertures. The coolant bed 118 is disposed between the first plate 116 and the second plate 117. Both the first plate 116 and the second plate 117 are arranged with their approximately planar surfaces substantially perpendicular to a longitudinal axis of pressure vessel 108. The plates 116, 117 may also be wire mesh screen.

The cannister 111 houses the pyrotechnic material 104. Preferably, the pyrotechnic material 104 occupies approximately half or slightly more than half of the total volume of the cannister 111. Preferably, the pyrotechnic material 104 is made up of grains which are compacted, that is, pressed together in the shape of a cylinder. The cannister 111 also has a plenum chamber 120 which includes the volume of the cannister 111 between the cannister cap 112 and the pyrotechnic material 104. The plenum chamber 120 is located between the second plate 117 and the pyrotechnic material 104. The plenum chamber 120 accommodates expansion of the gas generated by the pyrotechnic material 104. The pyrotechnic material 104 of the second embodiment 102 may have the same composition as the pyrotechnic material 4 of the first embodiment 2. But the pyrotechnic material 104 differs as to which outer surfaces have a coating of inhibitor. Preferably, the outer surface of the pyrotechnic material 104 between the pyrotechnic material 104 and the walls of the cannister 111 and the end of pyrotechnic material 104 further away from the plenum chamber 120, that is, the end of the pyrotechnic material 104 further away from the ignitor mechanism 106, have a coating of a chemically inert inhibitor, such as a ceramic material. This coating keeps such outer surfaces of the pyrotechnic material 104 from igniting or at least delays ignition of such other surface of the pyrotechnic material 104. For example, the inhibitor may be Sauereisen #30 or Sauereisen #63 made by Sauereisen Company of Pittsburgh, Pa. In both the first embodiment 2 and the second embodiment 102, the inhibitor is not used on the end of the pyrotechnic material 104 adjacent adjacent to ignitor mechanism 106 but only on the end of the pyrotechnic material 104 further away from the ignitor mechanism 106.

Referring to FIGS. 4 and 7, the nozzle 110 has a nozzle body 169 which has a tire end and a pyrotechnic end. The pyrotechnic end of the nozzle body 169 extends through a mouth 141 of the cannister cap 112 and a mouth 138 of the first plate 116. The tire end of the nozzle body 169 has means, such as screw threads, to attach the nozzle 110 directly to means on the tire valve 7, such as screw threads 43 on the outer circumference of the tire valve 7. The tire end of the nozzle body 169 has a well 142. The tire end of the nozzle body 169 is adapted to fit over and around the outer circumference of tire valve 7. The well 142 is dimensioned so that the tire valve 7 fits into the well 142. The screw thread or other attaching means of the nozzle body 169 are located on the inside walls of the well 142. The nozzle 110 also includes an optional stem depressor 144 for depressing the valve stem 45 of the tire valve 7 to allow inflating gas to pass through the tire valve 7 into the tire 9. The stem depressor 144 is a stationary pin which extends through a longitudinal nozzle bore 146 in the pyrotechnic end of the nozzle body 169.

The ignitor mechanism 106 is adapted to ignite the pyrotechnic material 104 and cause the pyrotechnic material 104 to burn. In the second embodiment 102 of the tire inflator, the ignitor mechanism 106 is located at the tire end of the cannister 111. The ignitor mechanism 106 extends through the mouth 138 of the first plate and through an aperture 136 in the second plate 117. The ignitor mechanism 106 is located immediately adjacent to and at a pyrotechnic end of the nozzle body 169. Referring to FIG. 7, the ignitor mechanism 106 includes: an ignitor body 170, an actuator tube 172 having a flange 174, a washer 176, a spider 178, a coil spring 182, a plunger, a shear pin 186, a firing pin 188, a plunger cavity 190, a star washer 192, a primer 194, a flash hole 196, a column of an intermediate ignition material 198, a main ignition charge 200 and a nozzle plate 202.

The main ignition charge 200 is a hotter and faster burning pyrotechnic material than the pyrotechnic material 104 diposed in the pressure vessel 108. The main ignition charge 200, for example, may be Arcite 497-C, manufactured by Atlantic Research Corporation and disclosed in U.S. Pat. No. 2,966,403 to L. L. Weil, entitled "Solid Propellant Compositions and Processes for Making Same". The intermediate ignition material 198 may be a column of aluminum/iron oxide ($Fe_2O_3$). The intermediate ignition material 198 and the main ignitor charge 200, together, act as an ignition means, adapted to be ignited by the primer to cause combustion of the pyrotechnic material 104.

The ignitor body 170 extends through the cannister cap 112 and into a portion of the cannister 111. The actuator tube 172 functions as an actuator member and has a tire end and pyrotechnic end. The actuator tube 172 is disposed within the nozzle bore 146 and a portion of a longitudinal ignitor bore 171 in the ignitor body 170. The actuator tube 172 has a tire end and a pyrotechnic end. The flange 174 is located at the tire end. The stem depressor 144 is axially disposed within the tire end of the actuator tube 172 and the stem depressor 144 extends out of the actuator tube 172 and into the well 142. The actuator tube 172 is movable within the nozzle bore 146 and the ignitor bore 171 by the tire valve 7. When the second embodiment 102 of the tire inflator is attached to the tire valve 7, the tire valve 7 abuts the flange 174 of the actuator tube 172 and moves the actuator tube 172. The shear pin 186 is disposed in the ignitor body 170 substantially radially to the ignitor bore 171 of the ignitor body 170 and extends into part of the ignitor bore 171. The shear pin 186 is a breakable member adapted to be broken by the actuator tube 172 when the actuator tube 172 is moved by the tire valve 7. The coil spring 182 is a driving member disposed inside a portion of the actuated tube 172 and adapted to be released by the shear pin 186 when the shear pin 186 breaks. Before the second embodiment 102 of the tire inflator is placed on the tire valve 7 for use, the coil spring 182 is in a compressed condition. The coil spring 182 is held in its compressed condition by the shear pin 186. When the shear pin 186 is broken, the coil spring 182 is released from its compressed position which allows the coil spring 182 to expand. The plunger has a plunger tail 184 at its tire end and a plunger head 185 at its pyrotechnic end. The plunger tail 184 extends partially into a pyrotechnic end of the coil spring 182. The plunger head 185 has a firing pin 188 at the pyrotechnic end of the plunger head 185. The plunger head 185 and firing pin 188 are driven by the coil spring 182 when the coil spring 182 expands. The primer 194 is adapted to be actuated by the firing pin 188 by impact of the firing pin 188 upon the primer 194 when the primer 194 is driven by the coil spring 182. The intermediate ignition material 198 is adapted to be ignited by the primer 194. The intermediate ignition material 198 then ignites the main ignition charge 200. The main ignition charge 200 is then ignited and causes combustion of the pyrotechnic material 104.

The ignitor body 170 is adjacent to, aligned and continuous with the nozzle body 169 and preferably integral with the nozzle body 169. The ignitor body 170 and nozzle body 169 have at least one gas passage and, preferably, two gas passages 134 extending radially into the nozzle bore 146. A support means for the actuator tube 172 includes the washer 176 and the spider 178. The stationary washer 176 is disposed around an outer cicumference of the actuator tube 172 at the tire end of the actuator tube 172 to support the actuator tube 172 and act as a gas seal for the inflating gas to prevent the inflation gas from escaping between the interior sides of the well 142 and the tire valve 7. The stationary spider 178 is also disposed around the actuator tube 172 on the pyrotechnic side of the washer 176 to support the actuator tube 172 and the stem depressor 144. The spider 178 has fingers extending radially from the spider 178 into longitudinal slots in the actuator tube 172. The longitudinal slots in the actuator tube 172 allows the actuator tube 172 to slide or move through the stationary spider 178. The plunger cavity is in the longitudinal ignitor bore 171 of the ignitor body 169. The plunger head 185 and firing pin 188 are adapted to move through the plunger cavity 190. A primer cavity 180 in the longitudinal bore 171 holds the primer 194. The star watcher 192 holds the primer 194 in position in the primer cavity 180. The flash hole 196 conducts a thermal signal from the primer 194 to the column of intermediate ignition material 198. A cavity for holding the intermediate ignition material 198 is smaller than a cavity to hold a main ignition charge.

In operation, when the nozzle 110 is screwed on the tire valve 7, or otherwise attached to the tire valve 7, the tire valve 7 extends into the interior of the well 142 of the tire end of the nozzle 110. The stem depressor 144 of the nozzle 110 presses upon the valve stem 45 of the tire valve 7, depressing the valve stem 45 and opening the tire valve 7 to allow entry of inflating gas into the tire 9. The outer end 47 of the tire valve 7 presses against the flange 174, moving the actuator tube 172 within the longitudinal bore 171 of the ignitor body 170 toward the pyrotechnic end of the ignitor body 170. The movable actuator tube 172 is allowed to slide to the right as shown in FIG. 7 in the nozzle bore 176 by longitudinal slots in the actuator tube 172 which allow the actuator tube 172 to pass through the stationary spider 178. Movement of the actuator tube 172 breaks the shear pin 186. Breakage of the shear pin 186 allows the compressed coil spring 180 to expand and move toward the right as shown in FIG. 7. The coil spring 180 expands against the plunger 184 moving the plunger 184 and firing pin 188 to the right through the plunger cavity 190, and causing the firing pin 188 to impact against the primer 194.

The primer 194 is held in position by the star washer 192 in order to allow the primer 194 to function as a gas seal to prevent passage of the gas through the cavity 180 occupied by the primer 194. The thermal signal from the primer 194 acts through a flash hole 196 and ignites a column of Thermite (aluminum-iron oxide $Fe_2O_3$), or other intermediate ignition material 198 which in turn ignites the main ignition charge 200. The hot gases from the main ignition charge 200 passed through a hole 203 in the nozzle plate 202 to ignite the pyrotechnic material 104. The inflating gas passes through the coolant bed 118, the gas passages 134, the longitudinal slots of the actuator tube 172, into the actuator tube 172, through the well 142, the tire valve 7 and into the tire 9.

The second embodiment 102 of the tire inflator has an insulator 148 provided around the outer circumference of the pressure vessel 108, with insulator end portions 150, around both ends of the pressure vessel 108. The insulator 148 is cylindrical in shape (as shown in FIG. 5) and extends slightly beyond the length of the pressure vessel 108 at each end. The insulator 148 and 150 may include one or preferably two layers of insulating material, such as corregated paper or plastic. In contrast to the first embodiment 2, the second embodiment 102 does not have an ignitor cap 50. Instead of ignitor cap 50 which is used on the first embodiment 2, the second embodiment 102 merely has an end portion 150 of insulator 148.

For both the first embodiment 2 and the second embodiment 102, the plenum chambers 20 and 120 allow growth of the pyrotechnic material 4 and 104 during combustion. The pyrotechnic material 4 and 104 upon combustion generates two products: an inflating gas and a residue which remains behind in the cannister. The residue from the pyrotechnic material 4 and 104 expands in volume to occupy a greater volume than the volume previously occupied by the pyrotechnic material 4 and 104 before combustion. The plenum chambers 20 and 120 provide the necessary space for expansion of this residue. Allowing space for such growth in the residue by means of the plenum chambers 20 and 120 facilitates lower pressure and, hence, slower rates of combustion of the pyrotechnic material 4 and 104. If it were desired to increase the combustion rate of the pyrotechnic material 4, this could be accomplished by providing a smaller plenum chamber or providing no plenum chamber at all. The absence of such expansion space would increase the pressure and, hence, cause faster burning.

Referring to FIGS. 2, 5 and 6, both the first embodiment 2 and the second embodiment 102 of the tire inflator have an over pressure relief means 54 provided in the cannister caps 12 and 112. The over-pressure relief means 54 is a safety device for release of excess pressure in the pressure vessels 8 and 108. The relief means 54 operates in conjunction with an aperture 56 in the cannister caps 12 and 112. The over-pressure relief means 54 may be a rupture disc 58, as illustrated in FIG. 1 or a relief valve 60, as illustrated in FIG. 3. Referring to FIGS. 1 and 6, the rupture disc 58 is adapted to rupture if the pressure in the pressure vessels 8 and 108 exceeds a predetermined pressure level. The ruptured disc 58 is adapted to rupture at a pressure level lower than the pressure level at which the pressure vessels 8 and 108 would rupture. The rupture disc 58 is disposed inside the cannister caps 11 and 111 and covers the aperture 56.

Referring to FIG. 3, the optional over-pressure relief valve 60 is disposed on the cannister caps 12 and 112 in place of the rupture disc 58 shown in FIG. 1. The relief valve 60 includes a disc 62 adapted to fit on the outer surface of the cannister caps 12 and 112, over the aperture 56. The relief valve 60 also has a plurality of prongs 64, preferably two prongs, extending from the disc 62 into the interior of the cannister caps 12 and 112. The prongs 64 may be press fit into the aperture 56 and resiliently engage the inner surface of cannister caps 12 and 112. The over pressure relief valve 60 is adapted to rupture or be blown out of the aperture 56 at a pressure which is lower than the level of pressure which the pressure vessels 8 and 108 can withstand. For example, a pressure in the range of about 300 psi (about 21.09 kg. per sq. cm) is normally developed in the pressure vessels 8 and 108 after ignition of the pyrotechnic material 4 and 104. The rupture disc 58 or the relief valve 60 may be designed to rupture at about 500 psi (about 35.15 kg. per sq. cm.) whereas the pressure vessels 8 and 108 may be designed to withstand pressures of about 1000 psi (about 70.3 kg. per sq. cm.) or higher.

The nozzles 10 and 110 also have a removable nozzle cap 68 over the tire end of the nozzles 10 and 110. The nozzle cap 68 covers the wells 42 and 142. The nozzle cap 68 is adapted to be removed when the tire inflator is about to be used. For example, the nozzle cap 68 may be a peelable adhesive.

Preferably, the tire inflator has a total length of less than about 10 inches (about 25.4 centimeters).

The pyrotechnic material 4 and 104 may have a composition such as that disclosed in U.S. patent application Ser. No. 500,810 filed Aug. 26, 1974, entitled "Low Temperature Gas Generated Propellant", which is a continuation-in-part application of parent application Ser. No. 395,481, filed Sept. 10, 1973, entitled "Pyrotechnic Composition with Combined Binder-Coolant", both filed in the name of E. F. Garner and having a common assignee with the present invention. In general, the pyrotechnic composition comprises a fuel; an inorganic oxidizer; and a coolant or combined binder and coolant (which also is referred to as just a coolant in the following description). The coolant is selected from the group consisting of magnesium carbonate, magnesium hydroxide, and a mixture of magnesium carbonate and magnesium hydroxide. It has been found that one may use as much of the binder-coolant as is necessary in the pyrotechnic material 4 and 104 to obtain the desired binder properties for the composition without raising the flame temperature of the gas, generated upon combustion, to an unacceptable level. The fuel may be selected from the group consisting of a carbonaceous material (such as carbon, carbon black or lamp black), aluminum and magnesium. The inorganic oxidizer may be selected from the group consisting of an alkali metal chlorate (such as potassium chlorate or sodium chlorate), an alkali metal perchlorate (such as potassium perchlorate or sodium perchlorate), an alkali metal nitrate (such as potassium nitrate or sodium nitrate). The coolant or combined binder and coolant may be selected from the group consisting of: magnesium carbonate, magnesium hydroxide, and a mixture of magnesium carbonate and magnesium hydroxide. A typical formulation of this pyrotechnic composition comprises: carbon which acts as a fuel; potassium chlorate ($KClO_3$) or potassium perchlorate ($KClO_4$) which acts as an oxidizer; and magnesium carbonate ($MgCO_3$) which acts as a coolant and binder.

In the case of the composition of carbonaceous fuel, inorganic oxidizer and magnesium carbonate coolant, a low temperature gas (about 800° F. or about 426.5° C. in one embodiment) is generated relatively slowly (in, for example, about 1 to 3 seconds). Optionally, the gas is cooled by contact with the metal chip coolant bed 18 or 118, to a temperature of from about 200° F. to about 600° F. (from about 93° C. to about 315.5° C.), for inflating the tire 9.

The pyrotechnic material 4 and 104 comprises by weight: from less than 1% to about 10% of one of the foregoing fuels, such as carbon; from about 30% to about 70% of one of the foregoing inorganic oxidizers, such as potassium chlorate; and from about 10% to about 60% of one of the foregoing coolants or combined binders and coolants, such as magnesium carbonate or a mixture of magnesium carbonate and magnesium hydroxide.

Preferably, in one embodiment, the pyrotechnic composition comprises by weight: about 1% to about 5% of one of the foregoing fuels, such as carbon; about 40% to about 60% of one of the foregoing inorganic oxidizers, such as potassium chlorate; and about 35% to about 55% of one of the foregoing combined binders and coolants, such as magnesium carbonate or a mixture of magnesium hydroxide and magnesium carbonate. When such compositions are exposed to the atmosphere, the magnesium hydroxide reacts with carbon dioxide ($CO_2$) in the air to form magnesium carbonate ($MgCO_3$). Magnesium carbonate is a highly oxygenated, cement-like material. Since magnesium hydroxide and magnesium carbonate are both coolants, not fuels, one can use as much as necessary. As a result, one has enough binder for the composition without raising the flame temperature of the gas to unacceptable levels. The free oxygen formed from the inorganic oxidizer, such as potassium perchlorate, is consumed by the fuel, such as carbon, forming carbon dioxide and evolving heat which is cooled by the decomposed magnesium carbonate.

In the pyrotechnic composition described in the foregoing paragraph, it is preferable, in most instances, to start with a mixture of magnesium hydroxide and magnesium carbonate, rather than magnesium hydroxide without magnesium carbonate. One should use enough magnesium hydroxide in the mixture to obtain the desired binding effect caused by the carbonation of the magnesium hydroxide. It has been found that the higher the proportion of magnesium hydroxide to magnesium carbonate that is used in the composition, the longer the reaction time will take.

In instances where mixtures of magnesium hydroxide and magnesium carbonate is used as the combined binder and coolant, the composition may comprise: from about 10% to about 30% magnesium hydroxide as compared to the entire composition and from about 20% to about 40% magnesium carbonate as compared to the entire composition. In many compositions it has been found advantageous for the mixture of magnesium hydroxide and magnesium carbonate to comprise about ½ magnesium hydroxide and about ½ magnesium carbonate.

A preferred embodiment has carbon as the fuel; potassium chlorate or perchlorate as the oxidizer; and magnesium carbonate as the coolant without using magnesium hydroxide. The relatively slow burning composition produces a relatively low temperature gas (which may optionally be further cooled as already discussed). It has been surprisingly found that the carbon fuel burns in the presence of the oxidizer at a very high temperature, but relatively slowly, with the magnesium carbonate decomposing to absorb the heat and produce the relatively low temperature gas product made up of, substantially, carbon dioxide ($CO_2$) and oxygen, with trace amounts of carbon dioxide (CO). One pyrotechnic composition which has been found to be particular desirable includes, by weight: about 3% carbon, about 45% potassium chlorate, and about 52% magnesium carbonate.

The foregoing compositions of pyrotechnic material 4 and 104 generate, upon combustion, a substantially non-toxic, non-condensable gas adapted to inflate a tire. The foregoing compositions are superior to celluloid because celluloid, upon combustion, would generate large amounts of toxic gas (carbon monoxide and nitric oxides) and steam (which would condense to water in a tire). The pyrotechnic materials 4 and 104 have a somewhat slower burning composition than a composition used to inflate a vehicle safety bag.

For both embodiments, the stem depressor 44 and 144 is optional because the pyrotechnic material 4 and 104 may be arranged to generate enough pressure to open the tire valve 7 without the use of a stem depressor 44 or 144.

In FIG. 8, as compared to the prior art of FIGS. 1-7, the embodiment of this invention with the combined nozzle and firing pin structure is shown in unassembled condition. The firing pin assembly 500 includes a firing pin 501 and a firing pin extension 502 with elongated arms 503 and prongs 504 and 505 extending in a plane perpendicular thereto. A spring 600 will serve to bias or load the firing pin assembly 500. The nozzle 700 which attached to the tire valve includes a body with shoulder 701 for receiving the spring 600 between the firing pin 501 and shoulder 702 for catching the prongs 504 and 505 when the firing pin assembly 500 is in loaded position with the spring 600 compressed.

The combined nozzle and firing pin structure is shown loaded in FIG. 9 with a cap 703 over the nozzle end 710 which will attach to the tire valve and be located within the longitudinal bore, as discussed in detail with relation to FIGS. 4 to 7.

The improvement of this embodiment of FIGS. 8 and 9 eliminates the need of a sheer pin to activate the firing pin (which is driven by the force of the spring) toward and into contact with the primer 800 which activates the gas producer when the connection of the nozzle at the tire end to the tire valve removes the prongs 504 and 503 from the shoulder 702.

The cap 703 is especially advantageous since it includes an extension 720 which extends into the well of the nozzle and fits between the arms 503 of the firing pin extension to prevent the prongs from being disengaged from the shoulder 702 accidentally.

We claim:

1. A light, portable, miniaturized tire inflator for inflating a tire having an inlet valve, and adapted to be carried in one hand, comprising:
    a pyrotechnic material as sole source of inflating gas to generate the inflating gas upon combustion to inflate the tire, without a source of stored fluid;
    an ignitor mechanism located adjacent to said pyrotechnic material to ignite and cause said pyrotechnic material to burn;
    a pressure vessel to hold said pyrotechnic material, said presssure vessel having a tire end and a pyrotechnic end; and
    a nozzle mounted on said tire end of said pressure vessel, said nozzle being adapted to be connected directly to the valve of the tire;
    said ignitor mechanism including a firing pin assembly comprising a firing pin and legs extending therefrom movable with a longitudinal bore adjacent said nozzle by said tire valve;
    a spring for biasing said firing pin assembly;
    prongs on the end opposite of said legs to said firing pin;
    shoulder means on said bore adjacent said nozzle for engaging said prongs and retaining said firing pin assembly against said spring unloaded condition;
    a prime spaced from said firing pin in loaded condition and adpated to be actuated by said firing pin by impact of said firing pin upon said primer on disengagement by said tire valve of said prongs from said shoulder means;

an ignition means adapted to be ignited by said primer and cause combustion of said pyrotechnic material; and an insulator disposed around substantially the entire exterior surface of said pressure vessel.

2. The tire inflator apparatus according to claim 1 and further comprising a cover for said nozzle which includes an extension from the cover to engage the legs of the firing pin assembly and maintain the prongs on the shoulder.

* * * * *

UNITED STATES PATENT AND TRADEMARK OFFICE
CERTIFICATE OF CORRECTION

PATENT NO. : 4,062,288
DATED : December 13, 1977
INVENTOR(S) : Robert Millray

It is certified that error appears in the above-identified patent and that said Letters Patent are hereby corrected as shown below:

Column 6, line 24, "other" should read -- outer --.

Column 12, line 64, "prime" should read -- primer --.

line 65, "adpated" should read -- adapted --.

Signed and Sealed this

Thirtieth Day of May 1978

[SEAL]

Attest:

RUTH C. MASON
Attesting Officer

LUTRELLE F. PARKER
Acting Commissioner of Patents and Trademarks